United States Patent [19]

Naito et al.

[11] 3,897,412

[45] July 29, 1975

[54] PAROMOMYCIN ANTIBIOTIC DERIVATIVES

[75] Inventors: Takayuki Naito; Susumu Nakagawa, both of Tokyo, Japan

[73] Assignee: Bristol-Myers Company, New York, N.Y.

[22] Filed: June 15, 1973

[21] Appl. No.: 370,280

Related U.S. Application Data

[63] Continuation-in-part of Ser. No. 250,389, May 4, 1972, abandoned.

[52] U.S. Cl................................ 260/210 AB; 424/180
[51] Int. Cl.² ........................................ C07H 15/20
[58] Field of Search............................ 260/210 AB

[56] References Cited
UNITED STATES PATENTS
3,781,268   12/1973   Kawaguchi et al........... 260/210 AB OTHER PUBLICATIONS
Omoto "The Journal of Antibiotics," Vol. XXIV, No. 7, 1971, pp. 430–434.

*Primary Examiner*—Johnnie R. Brown
*Attorney, Agent, or Firm*—Robert E. Havranek

[57] ABSTRACT

Derivatives of paromomycin have been prepared which possess substantially improved antibacterial activity. An example of such an agent is 1-[L-(−)-γ-amino-α-hydroxybutyryl]paromomycin [IVa,BB-K47].

6 Claims, No Drawings

PAROMOMYCIN ANTIBIOTIC DERIVATIVES

CROSS-REFERENCE TO RELATED APPLICATION

This application is a continuation-in-part of copending application Ser. No. 250,389 filed May 4, 1972 now abandoned.

BACKGROUND OF THE INVENTION

1. Field of the Invention

This invention relates to semisynthetic 1-substituted derivatives of paromomycin, said compounds being prepared by acylating the 1-amino-function of paromomycin with γ-amino-α-hydroxybutyryl, β-amino-α-hydroxypropionyl or δ-amino-α-hydroxyvaleryl moieties.

2. Description of the Prior Art:

A. Paromomycin is an antibiotic described in U.S. Pat. No. 2,916,385, which issued Dec. 8, 1959. The patent describes the preparation and structure of paromomycin and indicates the organism employed in the fermentation is deposited in the Culture Collection of the Fermentation Laboratory, Northern Utilization Research and Development Division, U.S. Department of Agriculture, Peoria, Illinois as NRRL 2455.

B. The compound is further described in the Eighth Edition of Merck Index on page 784.

SUMMARY OF THE INVENTION

The compound having the formula

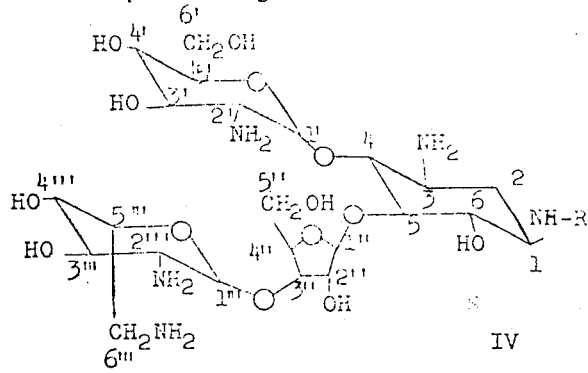

in which R is L-(−)-γ-amino-α-hydroxybutyryl, L-(−)-β-amino-α-hydroxypropionyl or L-(−)-δ-amino-α-hydroxyvaleryl; or a nontoxic pharmaceutically acceptable acid addition salt thereof is a valuable antibacterial agent.

This invention relates to semi-synthetic derivatives of paromomycin, said compounds being known as 1-[L-(−)-γ-amino-α-hydroxybutyryl] paromomycin (IVa), 1-[L-(−)-β-amino-α-hydroxypropionyl] paromomycin (IVb) or 1-[L-(−)-δ-amino-α-hydroxyvaleryl] paromomycin (IVc) and having the formula

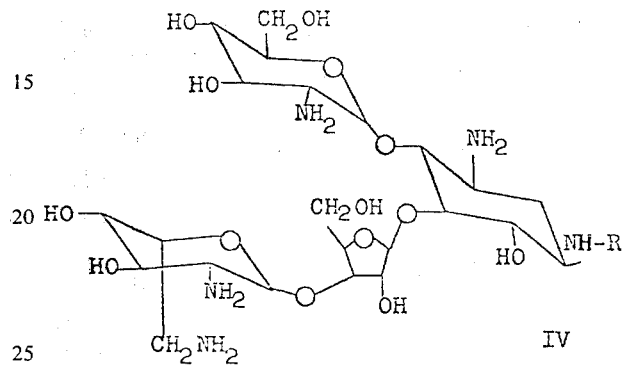

in which R is L-(−)-δ-amino-α-hydroxybutyryl, L-(−)-β-amino-α-hydroxypropionyl or L-(−)-δ-amino-α-hydroxyvaleryl; or a nontoxic pharmaceutically acceptable acid addition salt thereof.

For the purpose of this disclosure, the term "nontoxic pharmaceutically acceptable acid addition salt" shall mean a mono, di-, tri, tetra or pentasalt formed by the interaction of one molecule of compound IV with 1–5 moles of a nontoxic, pharmaceutically acceptable acid. Included among these acids are acetic, hydrochloric, sulfuric, maleic, phosphoric, nitric, hydrobromic, ascorbic, malic and citric acid, and those other acids commonly used to make salts of amine containing pharmaceuticals.

The compounds of the present invention are prepared by the following representative diagramatic scheme:

1.) Paromomycin $\xrightarrow{\text{N-(Benzyloxycarbonyloxy) Succinimide}}$

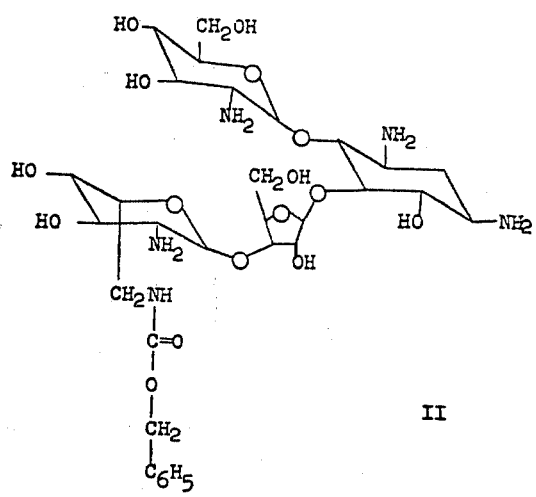

2.) Compound II  →(N-Hydroxysuccinimide ester of L-(−)-γ-benzyloxycarbonylamino-α-hydroxybutyric acid)→

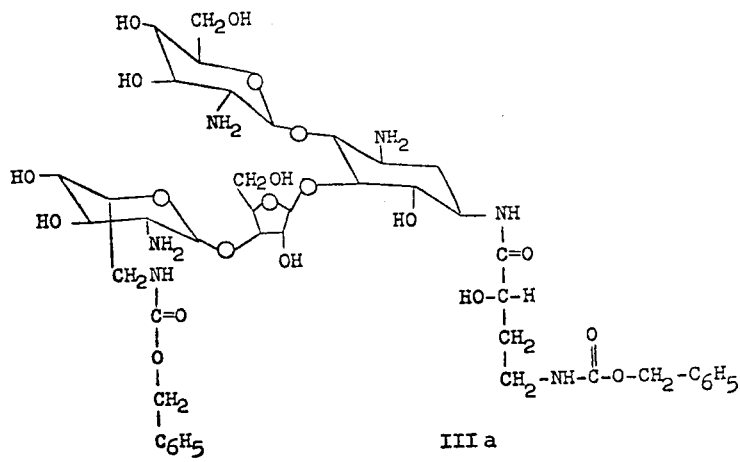

IIIa

3.) Compound IIIa  →H₂/Pd/C→

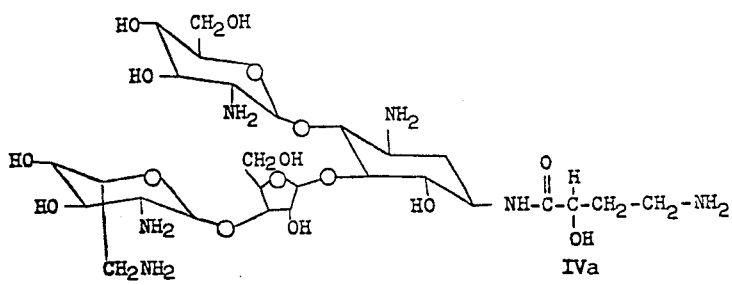

IVa

A preferred embodiment of the present invention is the compound having the formula

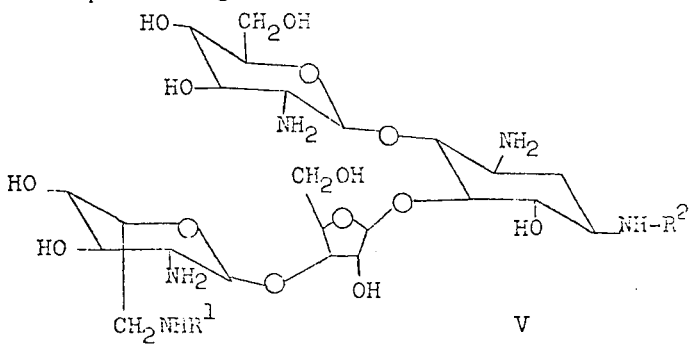

V in which R¹ is H or

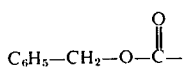

and R² is H, L-(−)-γ-amino-α-hydroxybutyryl, L-(−)-β-amino-α-hydroxypropionyl or L-(−)-δ-amino-α-hydroxyvaleryl; wherein R¹ and R² must be other than H; or a nontoxic pharmaceutically acceptable acid addition salt thereof.

Another preferred embodiment is the compound of formula V in which R¹ is

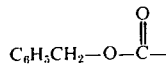

and R² is H.

A most preferred embodiment is the compound c formula V wherein R¹ is H and R² is L-(—)-γ-amino-α-hydroxybutyryl; or a nontoxic pharmaceutically acceptable acid addition salt thereof.

A most preferred embodiment is the compound of formula V wherein R¹ is H and R² is L-(—)-β-amino-α-hydroxypropionyl; or a nontoxic pharmaceutically acceptable acid addition salt thereof.

A most preferred embodiment is the compound of formula V wherein R¹ is H and R² is L-(—)-δ-amino-α-hydroxyvaleryl; or a nontoxic pharmaceutically acceptable acid addition salt thereof.

Other most preferred embodiments are the sulfate, hydrochloride, acetate, maleate, citrate, ascorbate, nitrate or phosphate salts of compound V.

Another most preferred embodiment is the monosulfate salt of compound V.

Still another most preferred embodiment is the disulfate salt of compound V.

The objectives of the present invention have been achieved, by the provision according to the present invention of the process for the preparation of the compound having the formula

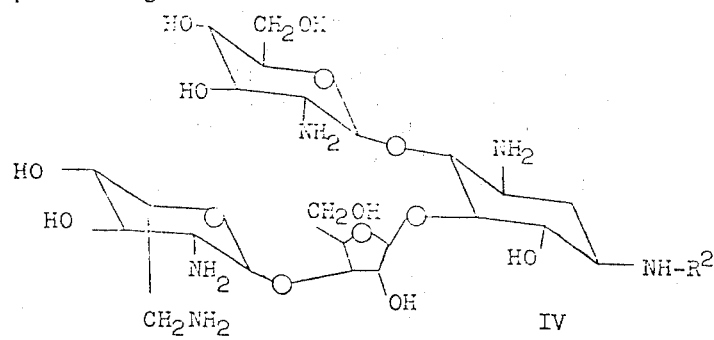

in which R² is L-(—)-γ-amino-α-hydroxybutyryl, L-(—)-β-amino-α-hydroxypropionyl or L-(—)-δ-amino-α-hydroxyvaleryl; or a nontoxic pharmaceutically acceptable acid addition salt thereof; which process comprises the consecutive steps of A. treating paromomycin with an agent selected from the compounds having the formulas

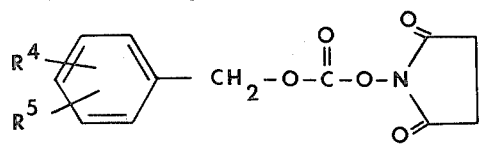

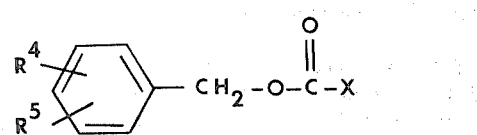

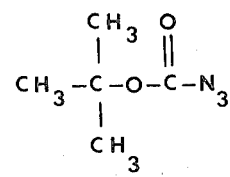

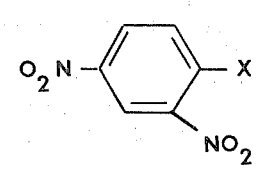

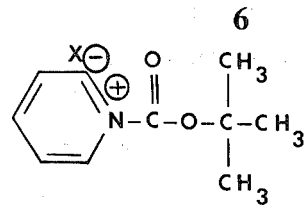

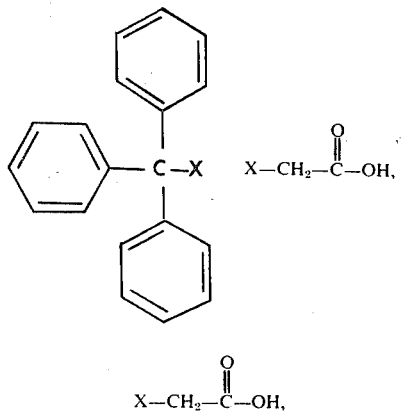

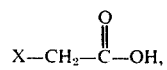

(or a carbodiimide addition compound thereof) or

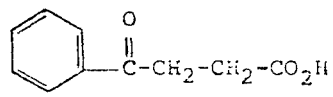

(or a carbodiimide addition thereof), in which R⁴ and R⁵ are alike or different and each is H, F, Cl, Br, NO₂, OH, (lower)alkyl or (lower)alkoxy, X is chloro, bromo or iodo, or a functional equivalent as a reactant; in a ratio of one mole or less of agent per mole of paromomycin in a solvent, preferably selected from the group comprised of dimethylformamide, dimethylacetamide, tetrahydrofuran, dioxane, 1,2-dimethoxyethane, methanol, ethanol, water, acetone, pyridine, N-(lower)alkylpiperidine, or mixtures thereof, but preferably 1:1 water-tetrahydrofuran, at a temperature below 50°C. and preferably below 25°C., to produce the compound having the formula

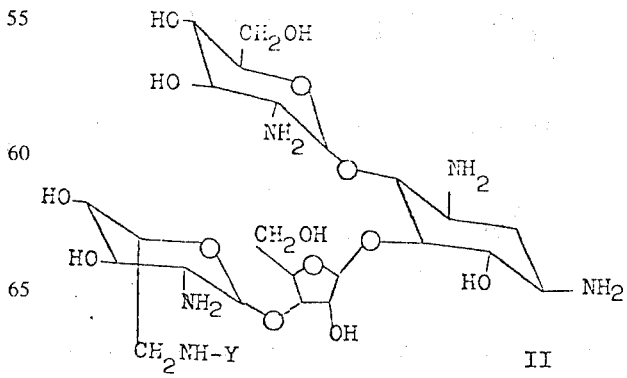

in which Y is a radical of the formula

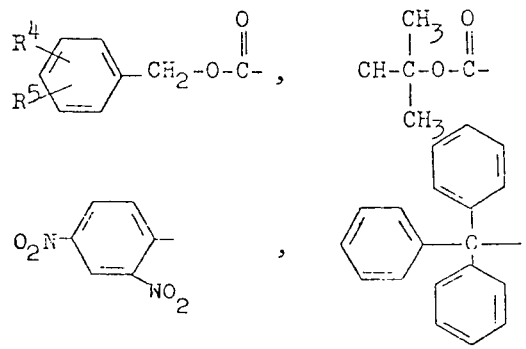

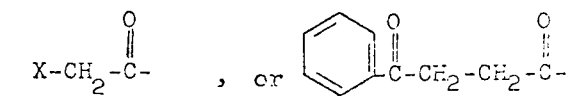

and X, R⁴ and R⁵ are as defined above:

B. acylating compound II with an acylating agent having the formula $$W-NH-(CH_2)_n-\overset{OH}{\underset{}{CH}}-\overset{O}{\underset{}{C}}-M \qquad VII$$

in which $n$ is an integer of 1 to 3 inclusive and W is a radical selected from the group consisting of

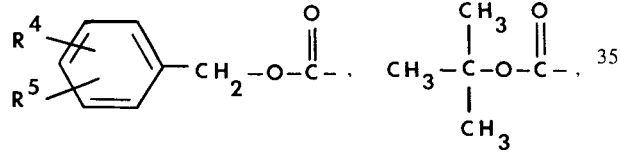

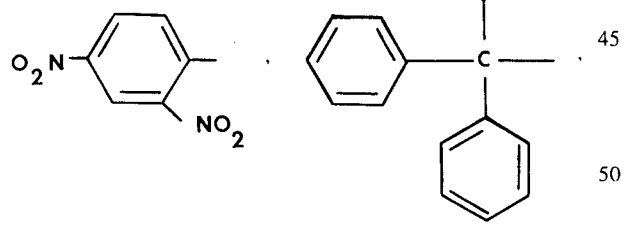

but preferably

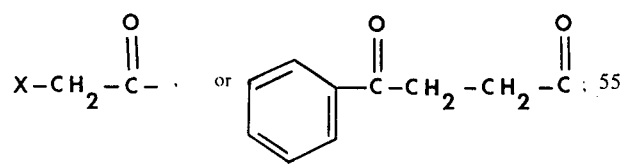

M is a radical selected from the group comprising

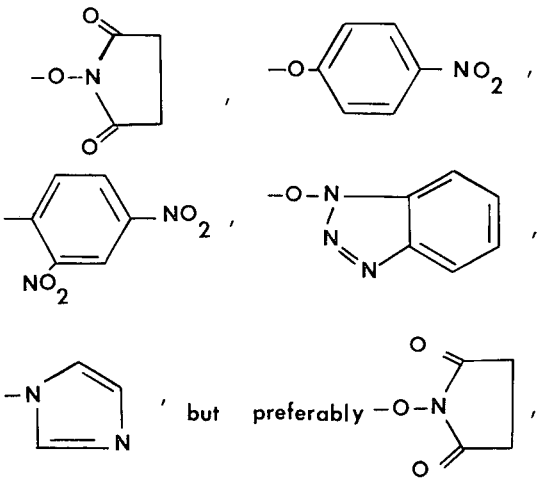

in which $R^4$ and $R^5$ are as above; in a ratio of at least 0.5 mole of compound VII per mole of compound II, but preferably in a ratio of about 0.5 to about 1.4, and most preferably in a ratio of about 0.8 to about 1.1, in a solvent preferably selected from the group comprising a mixture of water and ethyleneglycol dimethyl ether, dioxane, dimethylacetamide, dimethylformamide, tetrahydrofuran, propyleneglycol dimethyl ether, or the like but preferably 1:1 water-tetrahydrofuran, to produce the compound of the formula

[Structure III]

III in which $n$ is an integer of 1 to 3, and Y and W are as above; and

C. removing the blocking groups W and Y from compound III by methods commonly known in the art, and preferably when W and Y are radicals of the formula

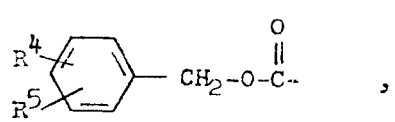

by hydrogenating compound III with hydrogen in the presence of a metal catalyst, preferably selected from the group comprising palladium, platinum, Raney nickel, rhodium, ruthenium and nickel, but preferably palladium, and most preferably palladium on charcoal, in a water-water miscible solvent system, preferably selected from the group comprising water and dioxane, tetrahydrofuran, ethyleneglycol dimethyl ether, propyleneglycol dimethyl ether, or the like, but preferably 1:1 water-tetrahydrofuran.

It should be apparent to those knowledgeable in the art that other agents can be used in the process above to acylate the amine functions of the intermediate compounds of the instant invention. This disclosure is meant to include all such acylating agents that produce labile amine blocking groups, said labile blocking groups commonly employed in the synthesis of peptides. The labile blocking groups must be readily removable by methods commonly known in the art. Examples of said labile blocking groups and their removal can be found in the review of A. Kapoor, J. Pharm. Sciences 59, pp. 1–27 (1970). Functional equivalents as acylating agent for primary amine groups would include corresponding carboxylic chlorides, bromides, acid anhydrides, including mixed anhydrides and particularly the mixed anhydrides prepared from stronger acids such as the lower aliphatic monoesters of carbonic acid, of alkyl and aryl sulfonic acids and of more hindered acids such as diphenylacetic acid. In addition, an acid azide or an active ester of thioester (e.g., with p-nitrophenol, 2,4-dinitrophenol, thiophenol, thioacetic acid) may be used or the free acid itself may be coupled with compound II after first reacting said free acid with N,N'-dimethylchloroforminium chloride [cf. Great Britain 1,008,170 and Novak and Weichet, Experientia XXI/6,360 (1965)] or by the use of enzymes or of an N,N'-carbonyldiimidazole or an N,N'-carbonylditriazole [cf. Sheehan and Hess, J. Amer. Chem. Soc., 77, 1067, (1955)] or of alkynylamine reagent [cf. R. Buijile and H. G. Viehe, Angew., Chem., International Edition 3, 582 (1964)], or of a ketenimine reagent [cf. C. L. Stevens and M. E. Monk, J. Amer. Chem. Soc., 80, 4065 (1958)] or of an isoxazolium salt reagent [cf. R. B. Woodward, R. A. Olofson and H. Mayer, J. Amer. Chem. Soc., 83, 1010 (1961)]. Another equivalent of the acid chloride is a corresponding azolide, i.e., an amide of the corresponding acid with amide nitrogen is a member of a quasiaromatic five membered ring containing at least two nitrogen atoms, i.e., imidazole, pyrazole, the triazoles, benzimidazole, benzotrizole and their substituted derivatives. As an example of the general method for the preparation of an azolide, N,N'-carbonyldiimidazole is reacted with a carboxylic acid in equimolar proportions at room temperature in tetrahydrofuran, chloroform, dimethylformamide or a similar inert solvent to form the carboxylic acid imidazolide in practically quantitative yield which liberation of carbon dioxide and one mole of imidazole. Dicarboxylic acids yield diimidazolides. The by-product, imidazole, precipitates and may be separated and the imidazolide isolated, but this is not essential. These reactions are well-known in the art [cf. U.S. Pat. Nos. 3,079,314, 3,117,126 and 3,129,224 and British Pat. Specification Nos. 932,644, 957,570 and 959,054].

Compound IVa, 1-[L-(−)-γ-amino-α-hydroxybutyryl]paromomycin, possesses excellent antibacterial activity. Illustrated below is a table showing the minimal inhibitory concentrations (MIC's) of paromomycin and compound IVa (BB-K47) against a variety of gram-positive and gram-negative bacteria as obtained by the Steers agar-dilution method (Table I). Nutrient Agar Medium was used in the study of Table 1.

In Vitro Antimicrobial Activities of BB-K47

| Strain | Bristol No. | MIC by Steer's Method (nutrient agar medium), mcg./ml. | |
|---|---|---|---|
| | | BB-K47 lot 1–2 | Paromomycin |
| E. coli NIHJ | | 1.6 | 1.6 |
| " Juhl | A15119 | 3.1 | 6.3 |
| " | A15169 | 3.1 | 3.1 |
| " KM-R* | A20363 | 1.6 | >100 |
| " | A9841 | 1.6 | 3.1 |
| " KM-R* | A20365 | 0.8 | 100 |
| " K-12 | | 1.6 | 3.1 |
| " " KM-R* | A20664 | 1.6 | 1.6 |
| " " KM-R* | A20665 | 1.6 | >100 |
| " W677 | A20684 | 1.6 | 1.6 |
| E. coli JR/W677 | A20685 | 12.5 | >100 |
| " NIHJ KM-R* | | 0.8 | 1.6 |
| K. pneumoniae D-11 | | 0.4 | 0.8 |
| " Type 22 No. 3038 | A20680 | 12.5 | >100 |
| S. marcescens | A20019 | 1.6 | 1.6 |
| P. aeruginosa D-15 | | 6.3 | 100 |
| " H9 D-133 KM-R* | | >100 | >100 |
| " | A9923 | 50 | >100 |
| " | A9930 | 0.8 | 12.5 |
| P. aeruginosa D-15 | A15150 | 25 | >100 |
| " | A15194 | 25 | >100 |
| " GM-R** | A20717 | 50 | >100 |
| " GM-R** | A20718 | 50 | >100 |
| P. vulgaris | A9436 | 0.8 | 0.8 |
| " | A9526 | 0.8 | 1.6 |
| P. mirabilis | A9554 | 1.6 | 3.1 |
| " | A9900 | 1.6 | 1.6 |
| P. morganii | A9553 | 1.6 | 1.6 |
| " | A20031 | 1.6 | 1.6 |
| S. aureus Smith | | 0.4 | 0.8 |
| " 209P SM-R*** | | 1.6 | 1.6 |
| " KM-R* | A20239 | 0.4 | >100 |
| Mycobacterium 607 | | 0.8 | 1.6 |
| " " KM-R* | | 12.5 | 12.5 |
| " " KM*, SM-R*** | | 3.1 | 6.3 |
| " phlei | | 0.4 | 0.8 |
| " ranae | | 0.8 | 0.8 |

KM*—Kanamycin Resistant.
GM**—Gentamicin Resistant.
SM***—Streptomycin Resistant.

Compounds IVb (BB-K 135) and IVc (BB-K 128) were also assayed in vitro as compared to compound IVa and paromomycin as shown below:

MIC (mcg./ml.)

| Organism | Bristol No. | IVb | IVc | IVa | Paromomycin |
|---|---|---|---|---|---|
| E. coli NIHJ | | 1.6 | 1.6 | 0.8 | 1.6 |
| " Juhl | A15119 | 3.1 | 1.6 | 0.8 | 1.6 |
| " | A15169 | 3.1 | 1.6 | 0.8 | 1.6 |
| " KM-R | A20363 | 12.5 | 3.1 | 0.8 | >100 |
| " | A9844 | 1.6 | 1.6 | 0.8 | 1.6 |
| " KM-R | A20365 | 3.1 | 1.6 | 0.2 | >100 |
| " K-12 | | 1.6 | 1.6 | 0.8 | 1.6 |
| " " KM-R | A20664 | 0.8 | 0.8 | 0.4 | 0.8 |
| " " KM-R | A20665 | 3.1 | 1.6 | 0.4 | 100 |
| " W677 | A20684 | 1.6 | 1.6 | 0.4 | 1.6 |
| " JR/W677 | A20683 | 12.5 | 25 | 3.1 | 100 |
| K. pneumoniae D-11 | | 0.4 | 0.8 | 0.1 | 0.4 |
| " Type 22 No. 3038 | A20680 | 50 | 50 | 12.5 | >100 |
| S. marcescens | A20019 | 1.6 | 1.6 | 0.8 | 1.6 |
| P. aeruginosa D-15 | | 50 | 6.3 | 6.3 | 50 |
| " H9 D-113 KM-R | | >100 | >100 | >100 | >100 |

− Continued

MIC (mcg./ml.)

| Organism | | Bristol No. | IVb | IVc | IVa | Paromomycin |
|---|---|---|---|---|---|---|
| " | | A9923 | 50 | 25 | 12.5 | 100 |
| " | | A9930 | 3.1 | 0.8 | 0.4 | 6.3 |
| " | | A15150 | 50 | 25 | 12.5 | >100 |
| " | | A15194 | 100 | >100 | 6.3 | 100 |
| " | GM-R | A20717 | 100 | 100 | 12.5 | >100 |
| " | GM-R | A20718 | 100 | 50 | 12.5 | >100 |
| P. vulgaris | | A9436 | 0.8 | 1.6 | 0.4 | 0.8 |
| " | | A9526 | 1.6 | 1.6 | 0.8 | 0.8 |
| P. mirabilis | | A9554 | 3.1 | 1.6 | 1.6 | 1.6 |
| " | | A9900 | 3.1 | 0.8 | 1.6 | 1.6 |
| P. morganii | | A9553 | 3.1 | 1.6 | 0.8 | 0.8 |
| " | | A20031 | 1.6 | 1.6 | 0.8 | 1.6 |
| S. aureus Smith | | | 0.4 | 0.2 | 0.2 | 0.2 |
| " | 209P SM-R | | 1.6 | 1.6 | 0.8 | 1.6 |
| " | KM-R | A20239 | 6.3 | 1.6 | 0.8 | 100 |
| Mycobacterium 607 | | | 1.6 | 0.4 | 0.4 | 0.4 |
| " | "KM-R | | 50 | 25 | 25 | 25 |
| " | "KM,SM-R | | 25 | 12.5 | 12.5 | 12.5 |
| " | phlei | | 0.4 | 0.2 | 0.1 | 0.2 |
| " | ranae | | 1.6 | 0.4 | 0.4 | 0.4 |

Compound IVa generally appears more potent against the test organisms than either IVb or IVc but all are still potent antimicrobial agents.

Compounds IV are valuable as an antibacterial agents, nutritional supplements in animal feeds, therapeutic agents in poultry and animals, including man, and are especially valuable in the treatment of infectious diseases caused by Gram-positive and Gram-negative bacteria.

Compounds IV when administered orally are useful as an adjunctive treatment for preoperative sterilization of the bowel. Both aerobic and anaerobic flora which are susceptible to these drugs are reduced in the large intestine. When accompanied by adequate mechanical cleansing, they are useful in preparing for colonic surgery.

Compounds IV are effective in the treatment of systemic bacterial infections when administered parenterally in the dosage range of about 250 mg. to about 3,000 mg. per day in divided doses three or four times a day. Generally the compounds are effective when administered at a dosage of about 5.0 to 7.5 mg./kg. of body weight every 12 hours.

Compounds of formula IV and the salts thereof are known to form mono- and polyhydrates upon isolation from aqueous solvents. Accordingly, the hydrates so produced are considered an integral part of the instant invention.

EXAMPLES

EXAMPLE 1

Preparation of L-(−)-γ-Benzyloxycarbonyl-amino-α-hydroxybutyric Acid (VIa)

L-(−)-γ-amino-α-hydroxybutyric acid (7.4 g., 0.062 mole) was added to a solution of 5.2 g. (0.13 mole) of sodium hydroxide in 50 ml. of water. To the stirred solution was added dropwise at 0°–5°C. over a period of 0.5 hour, 11.7 g. (0.068 mole) of carbobenzoxy chloride and the mixture was stirred for 1 hour at the same temperature. The reaction mixture was washed with 50 ml. of ether, adjusted to pH 2 with dilute hydrochloric acid and extracted with four 80-ml. portions of ether. The ethereal extracts were combined, washed with a small amount of saturated sodium chloride solution, dried with anhydrous sodium sulfate and filtered. The filtrate was evaporated in vacuo and the resulting residue was crystallized from benzene to give 11.6 g. (74%) of colorless plates; melting point 78.5°–79.5° C., $[\alpha]_D$ −4.5° ($c = 2$, $CH_3OH$). Infrared (IR) [KBr]: $c = 0$ 1740, 1690 cm$^{-1}$. Nuclear Magnetic Resonance (NMR) (acetone-$d_6$)δ (in ppm from TMS) 2.0 (2H, m), 3.29 (2H, d-d, J = 6.7 and 12 Hz), 4.16 (1H, d-d, J = 4.5 and 8Hz), 4.99 (2H,s), 6.2 (2H, broad), 7.21 (5H,s). The product is compound VIa.

Anal. calc'd for $C_{12}H_{15}NO_5$: C, 56.91; H, 5.97; N, 5.53. Found: C, 56.66; H, 5.97; N, 5.47.

EXAMPLE 2

N-Hydroxysuccinimide Ester of L-(−)-γ-benzyloxy carbonylamino-α-hydroxybutyric Acid (VIIa).

A solution of 10.6 g. (0.042 mole) of VIa and 4.8 g. (0.042 mole) of N-hydroxysuccinimide[1] in 200 ml. of ethyl acetate was cooled to 0° C. and then 8.6 g. (0.042)mole of N,N'-dicyclohexylcarbodiimide was added. The mixture was kept overnight in a refrigerator. The dicyclohexylurea which separated was filtered off and the filtrate was concentrated to about 50 ml. under reduced pressure to give colorless crystals of VIIa which were collected by filtration; 6.4 g./m.p. 121°–122.5°C. The filtrate was evaporated to dryness in vacuo and the crystalline residue was washed with 20 ml. of a benzene-n-hexane mixture to give an additional amount of VIIa. The total yield was 1.34 g. (92%). $[\alpha]_D$ 1.5° ($c = 2$, $CHCl_3$) IR(KBr) $c = 0$ 1810, 1755, 1740, 1680 cm$^{-1}$. NMR (acetone-d$_6$)δ (in ppm from TMS) 2.0 (2H,m), 2.83 (4H,s), 3.37 (2H,d-d, J = 6.5 and 12.5 Hz), 4.56 (1H,m), 4.99 (2H,s), 6.3 (2H,broad), 7.23 (5H,s).

Anal. calc'd C$_{16}$H$_{18}$N$_2$O$_7$: C, 54.85; H, 5.18; N, 8.00. Found: C, 54.79, 54.70; H, 5.21, 5.20; N, 8.14, 8.12.

1. G. W. Anderson et al., J. Am. Chem. Soc., 86, 1839 (1964).

EXAMPLE 3

Preparation of 6'''-N-Benzyloxycarbonylparomomycin (II)

To a stirred solution of 2.413 g. (3.92 m. mole) of paromomycin free base in 55 ml. of 45% aqueous THF (tetrahydrofuran) was added 975 mg., (3.92 m. mole) of N-benzyloxycarbonyloxysuccinimide at 10° C. The reaction mixture was stirred overnight at room temperature and evaporated under reduced pressure to remove the organic solvent. The resultant aqueous solution was filtered to remove any insoluble material and the filtrate was charged on a column of Amberlite CG-50 resin (NH$_4^+$, 60 ml.) [Amberlite]. The column was washed with 350 ml. H$_2$O and eluted with 0.1 N NH$_4$OH. The eluate was collected in 20 ml.-fraction. Fractions 13 to 21 were combined, evaporated under reduced pressure and lyophilized to give 1.19 g. (40%) of crude 6'''-benzyloxycarbonylparomomycin (II) which did not contain paromomycin itself. γ$_{c=o}$ 1700 cm$^{-1}$. The product was used for the next reaction without further purification.

EXAMPLE 4

Preparation of 1-[L-(−)-γ-benzyloxycarbonylamino-α-hydroxybutyryl]-6'''-carbobenzoxyparomomycin (IIIa)

To a stirred solution of 1.16 g. (1.55 m. mole) of 6'''-benzyloxycarbonylparomomycin in 30 ml. of 50% THF and water was added 542 mg. (1.55 m. mole) of N-hydroxysuccinimide ester of L-(−)-γ-benzyloxycarbonylamino-α-hydroxybutyric acid at 10° C. The reaction mixture was stirred for 5 hours at room temperature to yield a mixture of N-[L-(−)-γ-benzyloxycarbonylamino-α-hydroxybutyryl]-6'''-carbobenzoxyparomomycins of which 1-[L-(−)-γ-benzyloxycarbonylamino-α-hydroxybutyryl]-6'''-carbobenzoxyparomomycin (IIIa) was a major component.

EXAMPLE 5

Preparation of 1-[L-(−)-γ-amino-α-hydroxybutyryl] paromomycin (IVa)

The crude product IIIa from example 4 was hydrogenated under atmospheric pressure in the presence of 200 mg. of 10% palladium on charcoal overnight at room temperature. The reaction mixture was filtered and evaporated under reduced pressure to remove the organic solvent. The resultant aqueous solution was adsorbed on a column of Amberlite CG-50 (NH$_4^+$, 37 ml.). The column was washed with water and irrigated successively with 600 ml. of 0.1 N ammonia, 200 ml. of 0.2 N ammonia, 300 ml. of 0.3 N ammonia, 700 ml. of 0.5 N ammonia and finally 700 ml. of 1 N ammonia. The eluate was collected in 10-ml. fraction. The fractions were divided into the following groups by ninhydrin test, bioassay (B. subtilis) and TLC (silica gel, [S-110] CHCl$_3$—CH$_3$OH—28%NH$_4$OH—H$_2$O = 1:4:2:1, ninhydrin). The fractions belonging to the same group were combined, concentrated under reduced pressure and lyophilized.

| Group | Fraction No. | Eluted by | Wt. isolated | Compound |
|-------|------|------|------|------|
| 1 | 70–77 | 0.2N NH$_4$OH | 30 mg. (crude)*$^1$ | BB-K49 |
| 2 | 93–101 | 0.3N NH$_4$OH | 264 | Paromomycin |
| 3 | 109–116 | 0.3N NH$_4$OH | 17 | BB-K50 |
| 4 | 129–133 | 0.5N NH$_4$OH | 170*$^2$ | BB-K47 (IVa) |
| 5 | 139–142 | 0.5N NH$_4$OH | 29 | BB-K51 |
| 6 | 197–202 | 1N NH$_4$OH | 91 | BB-K48 |

*$^1$Rechromatography with Amberlite CG-50 (NH$_4^+$, 8 ml.) gave 17 mg. of pure BB-K49.
*$^2$Rechromatography with Amberlite CG-50 (NH$_4^+$, 10 ml.) gave 97 mg. of a pure product designated BB-K47, lot 1–2, the desired title product, 1-[L-(−)-γ-amino-α-hydroxybutyryl]paromomycin (IVa).

Properties:

| Code No. | M.p.(dec.) | Rf=$^1$ | γC=O(KBr) | [α]D(H$_2$O) |
|------|------|------|------|------|
| BB-K47 (IVa) (lot 1-2) | 185–188°C. | 0.17 | 1640$^{cm-1}$ | +58° |
| BB-K 48 | 190–192 | 0.07 | 1640 | |
| BB-K 49 | 260° | 0.27 | 1690=$^2$ 1640 | |
| BB-K50 | 173–178 | 0.27 | 1640 | |
| BB-K 51 | 185–189 | 0.18 | 1640 | |

=$^1$TLC: silica gel plate, CHCl$_3$-MeOH-28%NH$_4$OH-H$_2$O (1:4:2:1).
=$^2$Inexplicable for two carbonyl bands which did not change by repeating hydrogenation.

BB-K47 anal. calc'd. for C$_{27}$H$_{52}$N$_6$O$_{16}$·H$_2$CO$_3$·1/2H$_2$O:C,42.69; H, 7.04; N, 10.69.

Found: C, 42.69; H, 7.07; N, 10.26.

It has been confirmed by TLC that all of the products, BB-K47 to BB-K51, gave paromomycin and α-hydroxy-γ-aminobutyric acid by heating for 1.5 hours in 0.5 N sodium hydroxide solution.

EXAMPLE 6

Preparation of N-(Benzyloxycarbonyloxy)succinimide

N-hydroxysuccinimide (23 g., 0.2 mole) was dissolved in a solution of 9 g. (0.22 mole) of sodium hydroxide in 200 ml. of water. To the stirred solution was added dropwise 34 g. (0.2 mole) of carbobenzoxychloride with water-cooling and then the mixture was stirred at room temperature overnight to separate the carbobenzoxy derivative which was collected by filtration, washed with water and air dried. Yield 41.1 g. (82%). Recrystallization from benzene-n-hexane (10:1) gave colorless prisms melting at 78°–79° C.

EXAMPLE 7

Preparation of L-(−)-γ-amino-α-hydroxybutyric acid from ambutyrosin A or B or mixtures thereof Ambutyrosin A (5.0 gm.) [U.S. Pat. No. 3,541,078, issued Nov. 17, 1970] was refluxed with 160 ml. of 0.5 N sodium hydroxide for one hour. The hydrolysate was neutralized with 6N HCl and chromatographed on a column of CG-50 (NH$_4^+$ type). The desired L-(−)-γ-amino-α-hydroxybutyric acid was isolated by developing the column with water and removing the water by freeze drying. The L-(−)-amino-α-hydroxybutyric acid is characterized as a crystalline material having a m.p. of 212.5°–214.5° C. [Column 2, lines 31–38, U.S. Pat. No. 3,541,078].

EXAMPLE 8

Preparation of L-(−)-γ-amino-α-hydroxybutyric acid from DL-α-hydroxy-γ-phthalimidobutyric acid.

A. Dehydroabiethylammonium L-α-hydroxy-γ-phthalimidobutyrate: To a solution of 25 g. (0.1 mole) of α-hydroxy-γ-phthalimidobutyric acid[1] in 200 ml. of ethanol was added a solution of 29 g. (0.1 mole) of dehydroabiethylamine in 130 ml. of ethanol. The solution was shaken vigorously for a minute and stood at room temperature for 5 hours during which time fine needles crystallized out. The crystals were collected by filtration, washed with 50 ml. of ethanol and airdried to obtain 30.1 g. (56%) of a diastereomer of the dehydroabiethylamine salt. M.p. 93°–94° C. $[\alpha]_D^{24}$ +15° (C. 2.5, MeOH). Recrystallization from 300 ml. of ethanol gave 23.2 g. (43%) of the pure product. M.p. 94°–95° C. $[\alpha]^{24}$+10.8° (C. 2.5 MeOH). Further recrystallization did not change the melting point and the specific rotation.

Anal. calc'd. for $C_{32}H_{42}N_2O_5 \cdot H_2O$: C, 69.54; H, 8.02; N, 5.07. Found: C, 69.58; H, 8.08; N, 5.07.

1. Y. Saito et al., Tetrahedron Letters, 1970, 4863.

B. L-(−)-γ-amino-α-hydroxybutyric acid: To a solution of 1.5 g. (0.014 mole) of sodium carbonate in 40 ml. of water were added 5.3 g. (0.01 mole) of dehydroabietylammonium L-α-hydroxy-γ-phthalimidobutyrate and 60 ml. of ether. The mixture was shaken vigorously until all of the solid had dissolved. The ether layer was separated. The aqueous solution was washed twice with 20-ml. portions of ether and evaporated to 15 ml. under reduced pressure. To the concentrate was added 10 ml. of concentrated hydrochloric acid and the mixture was refluxed for 10 hours. After cooling, separated phthalic acid was removed by filtration. The filtrate was evaporated under reduced pressure. The residue was dissolved in 10 ml. of water and filtered to remove a small amount of insoluble phthalic acid. The filtrate was adsorbed on a column of Amberlite IR-120 ($NH_4^+$, 1 cm. × 35 cm.), the column was washed with 300 ml. of water and eluted with 1 N ammonium hydroxide solution. The eluate was collected in 15-ml. fraction. The ninhydrin positive fractions 10 to 16 were combined and evaporated under reduced pressure to give a syrup which recrystallized gradually. The crystals were triturated with ethanol, filtered and dried in a vacuum desiccator to give 0.78 g. (66%) of L-(−)-γ-amino-α-hydroxybutyric acid. M.p. 206–207° C. $[\alpha]_D^{24}$ −29° (C. 2.5, $H_2O$). The IR spectrum was identical with an authentic sample which was obtained from ambutyrosin.

EXAMPLE 9

Preparation of the Monosulfate Salt of 1-[L-(−)-γ-amino-α-hydroxybutyryl]paromomycin.

One mole of 1-[L-(−)-γ-amino-α-amino-α paromomycin is dissolved in 1 to 3 liters of water. The solution is filtered to remove any undissolved solids. To the chilled and stirred solution is added one mole of sulfuric acid dissolved in 500 ml. of water. The mixture is allowed to stir for 30 minutes, following which cold ethanol is added to the mixture until precipitation occurs. The solids are collected by filtration and are determined to be the desired monosulfate salt.

EXAMPLE 10

Preparation of the Disulfate Salt of 1[L-(−)-γ-amino-α-hydroxybutyryl]paromomycin One mole of 1-[L-(−)-γ-amino-α-hydroxybutyryl]-paromomycin is dissolved in 1 to 3 liters of water. The solution is filtered to remove any undissolved solids. To the chilled and stirred solution is added 2 moles of sulfuric acid dissolved in 100 ml. of water. The mixture is allowed to stir for 30 minutes, following which cold ethanol is added to the mixture until precipitation occurs. The solids are collected by filtration and are determined to be the desired disulfate salt.

EXAMPLE 11

Preparation of L-β-Benzyloxycarbonylamino-α-hydroxypropionic acid (VIb)

L-β-amino-α-hydroxypropionic acid* (8.2 g., 0.078 mole) was dissolved in a solution of 6.56 g. (0.0164 mole) of sodium hydroxide in 60 ml. of water. To the stirred solution was added dropwise 14.7 g. (0.086 mole) of carbobenzoxy chloride below 5° C. The mixture was stirred for an hour at room temperature, washed with 60 ml. of ether and adjusted to pH 2 with dilute HCl. The precipitate was collected by filtration, washed with water and air-dried to give 9.65 g. (52%) of VIb. The filtrate was extracted with five 100-ml. portions of ether. The ethereal solution was washed with water, dried over sodium sulfate and evaporated to dryness in vacuo to give additional 2.0 g. (11%) of VIb. A total of 11.65 g. of VIb was crystallized from 500 ml. of benzene-ethyl acetate (4:1) to give 9.36 g. (50%) of pure VIb; m.p. 128.5°–129.5° C. Infrared (IR) (KBr): $\gamma_{C=O}$ 1745, 1690 $cm^{-1}$. $[\alpha_D^{25°}$ +2.9° (c 5.0, MeOH). Nuclear Magnetic Resonance Spectra [NMR (DMSO-$d_6$)]: δ (in ppm) 3.05–3.45 (2H, m, $CH_2N$), 4.05 (1H, d-d, —O—CH—CO—), 5.03 (2H, s, $CH_2Ar$) 7.18 (1H, broad, NH), 7.36 (5H, s, ring H).

Anal. calcd'd for $C_{11}H_{13}NO_5$: C, 55.23; H, 5.48; N, 5.86. Found: C, 55.34; H, 5.49; N, 5.87.

*K. Freudenberg, Ber., 47, 2027 (1914).

EXAMPLE 12

Preparation of N-Hydroxysuccinimide Ester of L-β-benzyloxycarbonylamino-α-hydroxypropionic acid (VIIb).

To a chilled and stirred solution of 478 mg. (2 m.moles) of VIb and 230 mg. (2 m.moles) of N-hydroxysuccinimide in 10 ml. of tetrahydrofuran (THF) was added 412 mg. (2 m.moles) of dicyclohexylcarbodiimide. The mixture was stirred for an hour at 0°–5° C., for 2 hours at room temperature and then filtered to remove the N,N'-dicyclohexylurea. The filtrate containing VIIb was used for the next reaction without isolation.

EXAMPLE 13

Preparation of 1-[L-(−)-β-amino-α-hydroxypropionyl] paromomycin (IVb, BB-K135).

To a stirred solution of 750 mg (1 m mole) of 6'''-N-benzyloxycarbonylparomomycin (II) in 10 ml of water was added dropwise a solution of the activated ester VIIb in 10 ml of THF which was prepared from 239 mg (1 m mole) of β-benzyloxycarbonylamino-α-hydroxypropionic acid. The reaction mixture was stirred overnight and then hydrogenated overnight with 200 mg of 10% palladium on charcoal at room temperature at atmospheric pressure. The catalyst was filtered off and washed with water. The filtrate and washings were combined and concentrated in vacuo to remove most of the organic solvent. The aqueous solution was adjusted to pH 7 with 1 N hydrochloric acid and passed through a column of Amberlite CG-50 ($NH_4^+$, 15 ml), which was washed with 500 ml of water and then eluted with 700 ml of 0.1 N $NH_4OH$ and 1 l of 0.2 N $NH_4OH$. The eluate was collected in 10 -ml fraction. Tube Nos. 97–106 which showed Rf 0.23 by TLC with S-110 system (ninhydrin) and activity against Pseudomonas aeruginosa were combined, evaporated in vacuo and freeze-dried to give 34.7 mg (4.7%) of IVb; m.p. 181°–186°C (dec). IR (KBr): 1650, 1560 $cm^{-1}$.

Anal. calcd'd for $C_{26}H_{50}N_6O_{16}\cdot 2H_2CO_3$: C, 40.68; H, 6.58; N, 10.16. Found: C, 40.69; H, 6.44; N, 10.25.

EXAMPLE 14

Preparation of L-δ-Benzyloxycarbonylamino-α-hydroxyvaleric acid (VIc)

To a stirred solution of 400 mg (3.0 m moles) of L-δ-amino-α-hydroxyvaleric acid* and 250 mg (6.5 m moles) of sodium hydroxide in 25 ml of water was added dropwise 580 mg (3.3 m moles) of carbobenzoxy chloride over a period of 30 minutes at 0°–5°C. The mixture was stirred for an hour at 5°–15°C, washed with 25 ml of ether, adjusted to pH 2 with hydrochloric acid and extracted with three 30-ml portions of ether. The combined ethereal solution was shaken with 10 ml of a saturated sodium chloride solution, dried over anhydrous sodium sulfate and evaporated in vacuo to give crystals which were recrystallized from benzene to yield 631 mg (78%) of VIc; m.p. 110°–111°C; infrared spectrum [IR(KBr)]: 3460, 3350, 1725, 1685, 1535, 1280, 730, 690$cm^{-1}$. Nuclear magnetic resonance spectrum [NMR(acetone-$d_6$)] δ (in ppm) 1.70(4H, m) 4.14(2H, q, J=4.5Hz), 4.19(1H, m), 4.82(2H, s), 6.2(3H, broad), 7.25(5H, s). $[\alpha]_D^{25}$ + 1.6 (c 10, MeOH).

Anal. Calc'd for $C_{13}H_{17}NO_5$: C, 58.42; H. 6.41; N, 5.24. Found: C, 58.36; H, 6.50; N, 5.27.

*S. Ohshird et al., Yakugaku Zasshi, 87, 1184 (1967).

EXAMPLE 15

N-Hydroxysuccinimide ester of L-δ-benzyl oxycarbonylamino-α-hydroxyvaleric acid (VIIc).

To a stirred and chilled solution of 535 mg (2.0 m moles) of VIc and 230 mg (2.0 m moles) of N-hydroxysuccinimide in 55 ml of ethyl acetate was added 412 mg (2.0 m moles) of N, N'-dicyclohexylcarbodiimide (DCC). The mixture was stirred for 3 hours at room temperature and filtered to remove precipitated N, N'-dicyclohexylurea. The filtrate was evaporated in vacuo to yield 780 mg (100%) of viscous syrup (VIIc). IR(Neat): $\gamma_{C=O}$ 1810, 1785, 1725 $cm^{-1}$.

EXAMPLE 16

Preparation of 1[L-(−)-δ-amino-α-hydroxyvaleryl] paromomycin (IVc, BB-K128).

To a stirred solution of 750 mg (1 m mole) of 6'''-N-benzyloxycarbonylparomomycin (II) in 10 ml of water was added dropwise a solution of the activated ester VIIc in 10 ml of THF which was prepared from 267 mg (1 m mole) of L-δ-benzyloxycarbonylamino-α-hydroxyvaleric acid. The mixture was stirred overnight at room temperature and the hydrogenated for 4 hours with 200 mg of palladium charcoal at room temperature at ordinary pressure. The catalyst was removed by filtration and washed with water. The filtrate and washings were evaporated in vacuo to remove most of the organic solvent. The resultant aqueous solution was adjusted to pH 7 with 1 N hydrochloric acid and adsorbed on a column of Amberlite CG-50 ($NH_4^+$, 15 ml), which was washed with 200 ml of water and then eluted with each 1,000 ml of 0.1 N $NH_4OH$, 800 ml of 0.2 N $NH_4OH$, 500 ml of 0.5 N $NH_4OH$ and 500 ml of 1.0 N $NH_4OH$. The eluate was collected in 10-ml fraction and divided into the following appropriate fractions on the basis of Rf value by TLC (S-110, ninhydrin) and disk assay (*Bacillus subtilis* and *Psuedomonas aeruginosa*). Each fraction was evaporated in vacuo and the residue was freeze-dried.

| Fraction | Tube No. | $NH_4OH$ | Weight | BB-K No. | Identity |
|---|---|---|---|---|---|
| 1 | 117–130 | 0.2 N | 101.5 mg | | paromomycin I |
| 2 | 198–204 | 0.5 N | 34.3 mg (4.7 %) | IVc | 1-N-acylated compound |
| 3 | 244–255 | 1.0 N | 33.8 mg (4 %) | BB-K 129 | diacylated compound |

Physico-chemical data:
| BB-K No. | IR (KBr) | Mp | Rf value (S—110, ninhydrin) |
|---|---|---|---|
| BB-K 128 | 1640, 1570 $cm^{-1}$ | 179–185°C | 0.21 |
| BB-K 129 | 1640, 1560 $cm^{-1}$ | 184–188°C | 0.09 |

Microanalyses:
BB-K 128: Calcd for $C_{28}H_{54}N_6O_{16}\cdot 3H_2CO_3$: C, 40.61; H, 6.60; N, 9.17. Found: C, 40.73; H, 6.87; N, 9.17.
BB-K 129: Calcd for $C_{33}H_{63}N_7O_{18}\cdot 4H_2CO_3$: C, 40.62; H, 6.54; N, 8.96. Found: C, 40.52; H, 6.49; N, 8.80.

Both BB-K 128 and BB-K 129 regenerated paromomycin and γ-amino-α-hydroxyvaleric acid on heating with 0.5 N sodium hydroxide.

BB-K 129 was assumed to be diacylated product on the basis of slower mobility on a TLC plate and Amberlite CG-50 column.

Amberlite CG-50 is the tradename for the chromatographic grade of a weakly acidic cationic exchange resin of a carboxylic-polymethylacrylic type.

Amberlite IR-120 is the tradename for a high density nuclear sulfonic acid type cationic exchange resin supplied in either hydrogen or sodium form as beads—16–50 mesh.

We claim:
1. A compound having the formula

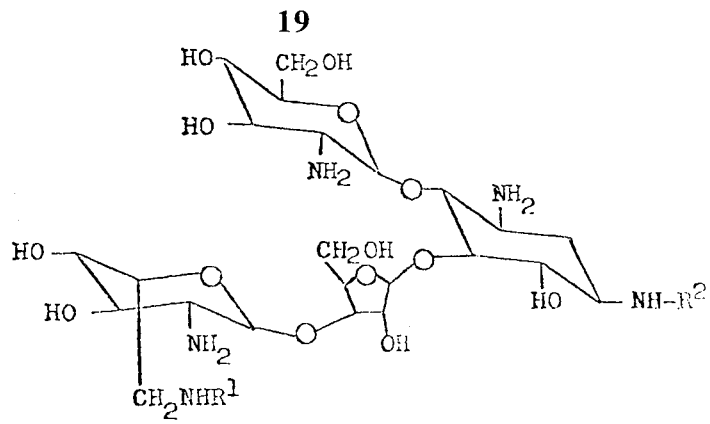

in which R¹ is H or

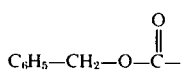

and R² is H, L-(−)-β-amino-α-hydroxypropionyl, L-(−)-δ-amino-α-hydroxyvaleryl, L-(−)-β-benzyloxycarbonylamino-α-hydroxypropionyl, or L-(−)-δ-benzyloxycarbonylamino-α-hydroxyvaleryl, wherein R¹ or R² must be other than H; or a nontoxic pharmaceutically acceptable acid addition salt thereof.

2. The compound of claim 1 wherein R¹ is

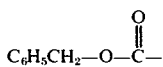

and R² is H.

3. A compound of claim 1 wherein R¹ is $C_6H_5CH_2$—O—C— and R² is L-(−)-β-benzyloxycarbonylamino-α-hydroxypropionyl or L-(−)-δ-benzyloxycarbonylamino-α-hydroxyvaleryl.

4. A compound of claim 1 wherein R¹ is H and R² is L-(−)-β-amino-α-hydroxypropionyl or L-(−)-δ-amino-α-hydroxyvaleryl; or a nontoxic pharmaceutically acid addition salt thereof.

5. The compound of claim 4 wherein R¹ is H and R² is L-(−)-β-amino-α-hydroxypropionyl; or the mono- or disulfate salt thereof.

6. The compound of claim 4 wherein R¹ is H and R² is L-(−)-δ-amino-α-hydroxyvaleryl; or the monodisulfate salt thereof.

* * * * *

UNITED STATES PATENT OFFICE
CERTIFICATE OF CORRECTION

Patent No. 3,897,412                    Dated  July 29, 1975

Inventor(s) Takayuki Naito, Susumu Nakagawa and Soichiro Toda

It is certified that error appears in the above-identified patent and that said Letters Patent are hereby corrected as shown below:

On the Cover Sheet, in item [75] the following should be added:

-- Soichiro Toda, Kasukabe-shi Saitama-ken, Japan --.

Signed and Sealed this eleventh Day of November 1975

[SEAL]

Attest:

RUTH C. MASON
Attesting Officer

C. MARSHALL DANN
Commissioner of Patents and Trademarks